(12) United States Patent  (10) Patent No.: US 9,333,800 B2
Wiechmann et al.  (45) Date of Patent: May 10, 2016

(54) DRUM PILOTING HUB

(71) Applicant: Webb Wheel Products, Inc., Cullman, AL (US)

(72) Inventors: Adam Wiechmann, Decatur, AL (US); Charlie Long, Hartselle, AL (US)

(73) Assignee: Webb Wheel Products, Inc., Cullman, AL (US)

( * ) Notice: Subject to any disclaimer, the term of this patent is extended or adjusted under 35 U.S.C. 154(b) by 139 days.

(21) Appl. No.: 14/153,375

(22) Filed: Jan. 13, 2014

(65) Prior Publication Data

US 2014/0197676 A1 Jul. 17, 2014

Related U.S. Application Data

(60) Provisional application No. 61/751,708, filed on Jan. 11, 2013.

(51) Int. Cl.
 *B60B 27/00* (2006.01)

(52) U.S. Cl.
 CPC ......... *B60B 27/0047* (2013.01); *B60B 27/0057* (2013.01)

(58) Field of Classification Search
 CPC ........................ B60B 27/0057; B60B 27/0047
 USPC ...................................................... 301/105.1
 See application file for complete search history.

(56) References Cited

U.S. PATENT DOCUMENTS

| | | | | |
|---|---|---|---|---|
| 2,781,231 A | * | 2/1957 | Black ......................... | 301/105.1 |
| 3,882,975 A | * | 5/1975 | Jedlitschka et al. .......... | 188/271 |
| 4,699,433 A | * | 10/1987 | Kopp ............................. | 301/6.6 |
| 5,584,949 A | * | 12/1996 | Ingram ......................... | 152/417 |
| 5,921,633 A | * | 7/1999 | Neibling et al. ............... | 301/6.1 |
| 6,257,678 B1 | * | 7/2001 | Brookey et al. ............ | 301/105.1 |
| 6,485,188 B1 | * | 11/2002 | Dougherty ..................... | 384/589 |
| 6,612,657 B1 | * | 9/2003 | Fakhoury et al. .......... | 301/105.1 |
| 6,811,003 B2 | * | 11/2004 | Novak .......................... | 188/72.1 |
| 6,880,247 B2 | * | 4/2005 | Toda et al. ................ | 29/898.062 |
| 7,111,911 B2 | * | 9/2006 | Baumgartner et al. .... | 301/105.1 |
| 7,393,064 B2 | * | 7/2008 | Hall et al. .................. | 301/105.1 |
| 8,186,888 B2 | * | 5/2012 | Ohtsuki ........................ | 384/544 |
| 8,287,052 B2 | * | 10/2012 | Fakhoury et al. .......... | 301/105.1 |
| 8,302,309 B2 | * | 11/2012 | Hirai et al. ................ | 29/894.321 |
| 2004/0207249 A1 | * | 10/2004 | Baumgartner et al. .... | 301/105.1 |
| 2005/0236886 A1 | * | 10/2005 | Hall et al. .................. | 301/105.1 |
| 2010/0132444 A1 | * | 6/2010 | Dodd .......................... | 73/117.03 |
| 2010/0308643 A1 | * | 12/2010 | Orey et al. .................. | 301/105.1 |
| 2011/0156475 A1 | * | 6/2011 | Fakhoury et al. .......... | 301/105.1 |
| 2011/0215637 A1 | * | 9/2011 | Fakhoury et al. .......... | 301/105.1 |
| 2013/0076110 A1 | * | 3/2013 | Kelley et al. ............... | 301/105.1 |
| 2013/0334867 A1 | * | 12/2013 | Christ et al. .................... | 301/6.1 |
| 2014/0197676 A1 | * | 7/2014 | Wiechmann et al. ...... | 301/105.1 |
| 2014/0252846 A1 | * | 9/2014 | Sawant ....................... | 301/105.1 |
| 2014/0261940 A1 | * | 9/2014 | Helmer et al. ............... | 152/415 |
| 2015/0015058 A1 | * | 1/2015 | Perini ......................... | 301/105.1 |
| 2015/0165819 A1 | * | 6/2015 | Niebling et al. ........... | 301/105.1 |

* cited by examiner

*Primary Examiner* — Jeffrey J Restifo
(74) *Attorney, Agent, or Firm* — Andrus Intellectual Property Law, LLP

(57) ABSTRACT

A wheel hub includes a hub barrel and a hub mounting portion positioned concentrically around the hub barrel. The hub mounting portion includes a number of flange holes adapted to receive a number of corresponding wheel studs. A number of drum pilots are positioned one each between the hub barrel and the hub mounting portion and are concentric with the hub barrel. The drum pilots are radially aligned with the flange holes so that each of the flange holes has a corresponding drum pilot.

19 Claims, 6 Drawing Sheets

DRUM PILOTING HUB

CLAIM OF PRIORITY

This application claims priority to U.S. Provisional Patent Application No. 61/751,708, filed Jan. 11, 2013, the contents of which are hereby incorporated by reference.

FIELD OF THE INVENTION

The present technology relates generally to wheel hubs and, in particular, to a wheel hub including pilots for mounting a brake drum thereon.

BACKGROUND

Non-concentric mounting of brake drums is both a performance and safety concern in the heavy vehicle industry. A drum that is mounted in a non-concentric manner overloads a portion of the braking surface during braking events often causing premature failure. In addition, a misaligned (with respect to the hub) drum or wheel can cause vibrations and shimmy. As a result, standard hubs in the heavy vehicle industry typically have pilots that consist of both a wheel mounting feature and drum mounting feature. The diameters of both are controlled by industry specifications put in place to support interchangeability in the marketplace. Common issues in the marketplace include both non-concentric alignment of the brake drum and hub and corrosion welding of the hub and drum in service. Both create a myriad of problems in service.

While all hubs have pilots for drum mounting, none are created in such a way to minimize both non-concentric mounting and corrosion welding of the products in the field. In some locations, external tools are used to ensure proper alignment of the drum to the hub. These are tools that are bolted onto the hub during assembly to aid in the alignment of the drum. Once the wheel and drum is torqued onto the assembly, these tools must be removed. These tools are not part of the system, and still run the risk of non-concentric mounting as they align the drum using the bolt holes (through holes) of the drum. The dimensional tolerance of these holes is not held as tightly as the pilot diameter on the hub. Further, this tool only influences mounting and does not have any influence on corrosion welding of the drum and hub.

DETAILED DESCRIPTION OF EMBODIMENTS

Figure 1:
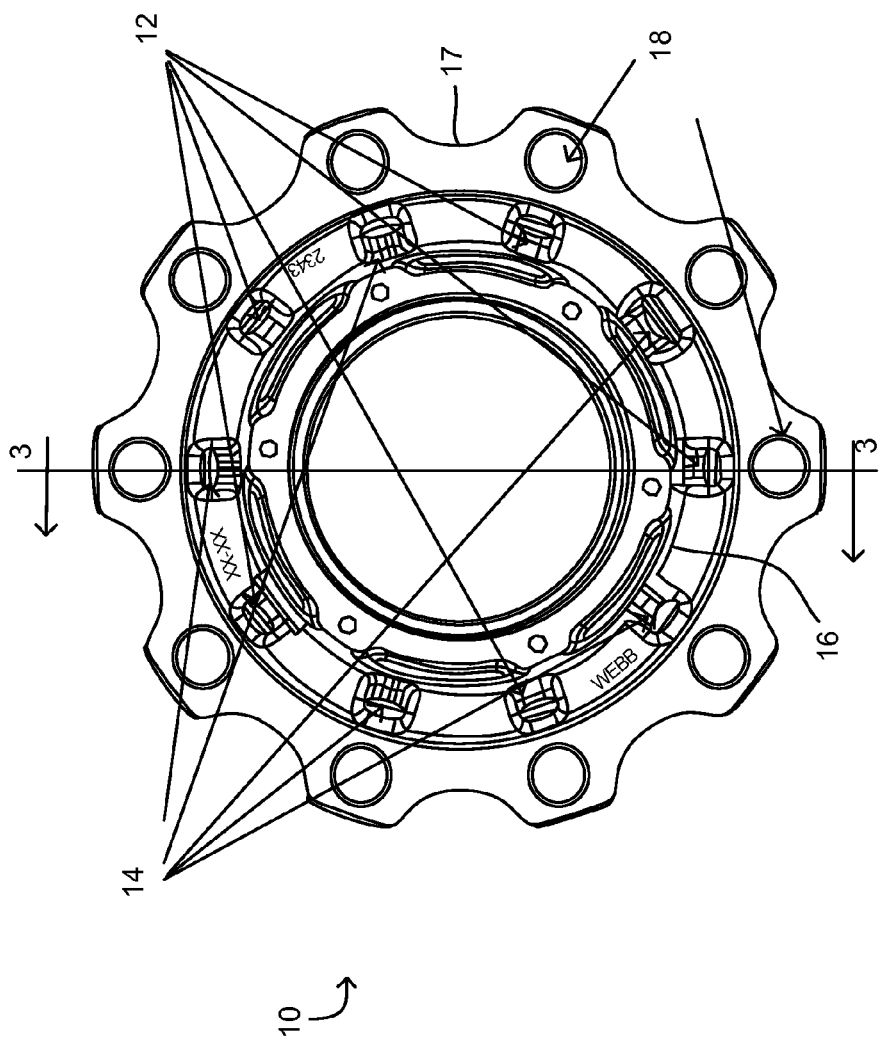
FIG. 1 is a side elevational view of an embodiment of the drum piloting hub of the present invention.

An embodiment of the drum piloting hub of the present invention is indicated in general at 10 in FIG. 1. This embodiment of the drum piloting hub greatly reduces the chance of mismount of a brake drum to the hub due to two features: (1) the drum pilots are aligned with the studs creating equal and opposite centering forces, and (2) the drum pilots feature proper sizing and configuration to minimize frictional forces on the drum-hub interface, which resist proper joint alignment. Finally, by avoiding a continuous drum pilot, the drum piloting hub of FIG. 1 minimizes the area in which corrosion welding can occur on the product. The specifics of the drum piloting hub of FIG. 1 will now be described.

Figure 3:
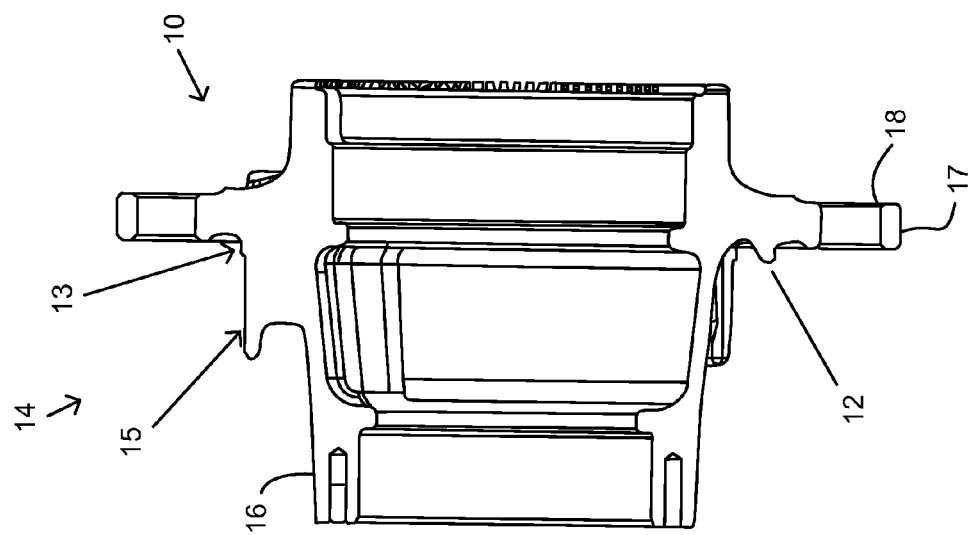
FIG. 3 is a cross sectional view of the drum piloting hub of FIG. 1 taken along line 3-3 of FIG. 1.

As illustrated in FIGS. 1 and 3, the hub 10 includes both individual drum pilots 12 (lacking the wheel mounting feature) in addition to wheel/drum combination pilots 14. As illustrated in FIG. 3, the wheel/drum combination pilots include a drum mounting feature 13 and a wheel mounting feature 15.

Figure 4:
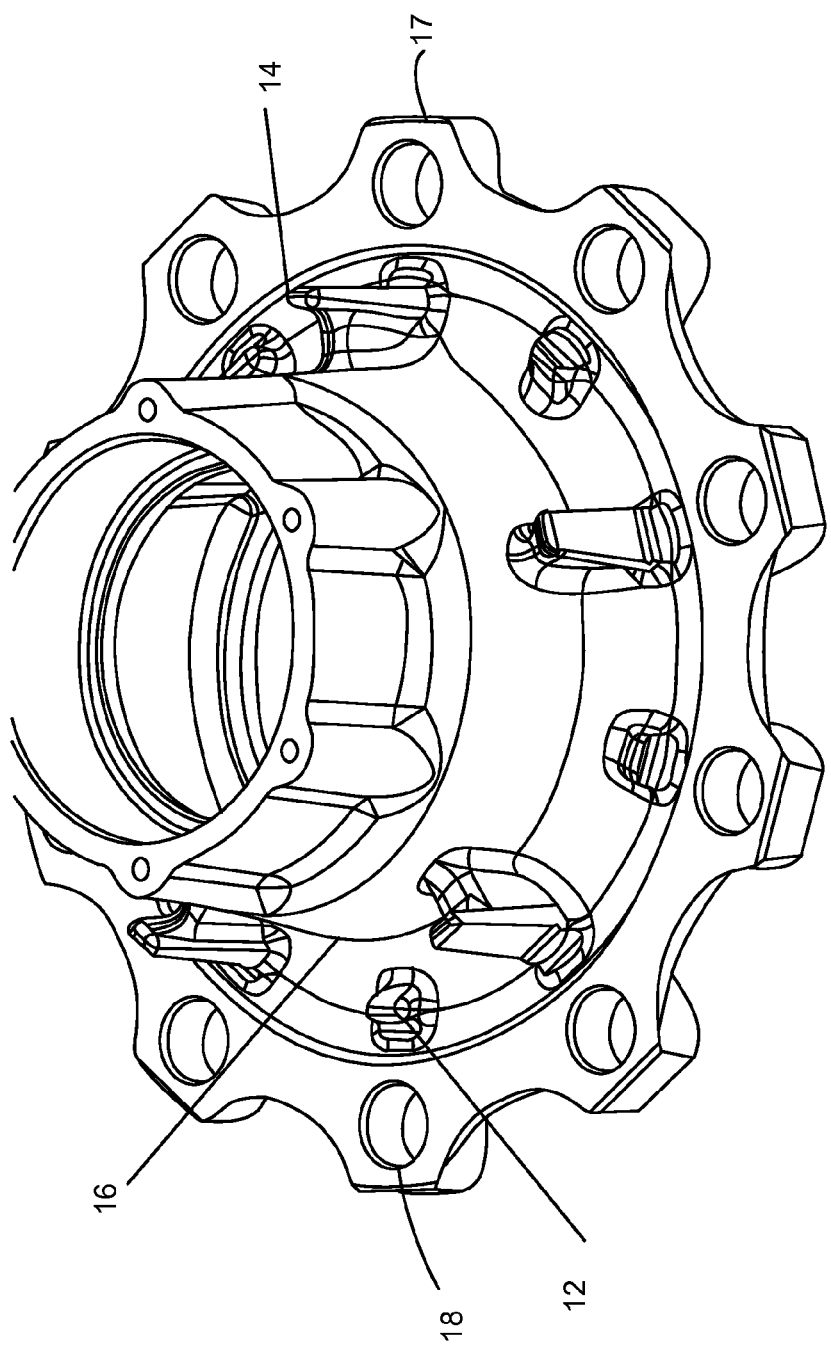
FIG. 4 is a partial perspective view of the drum piloting hub of FIGS. 1-3.

As best shown in FIGS. 1 and 4, the individual drum pilots 12 and the wheel/drum combination pilots 14 surround a hub barrel 16. The pilots are surrounded by a hub mounting portion 17.

As also illustrated in FIGS. 1 and 4, the drum and wheel/drum pilots are concentric. More specifically, the orientation of each drum pilot, whether part of a combination wheel/drum pilot or standalone, is radially aligned with the flange holes 18 of the hub, which correspond to the wheel studs (indicated at 22 in FIGS. 5 and 6). Furthermore, the drum piloting hub 10 provides a drum pilot or a wheel/drum pilot at each of the associated flange holes 18 on the hub. In addition, the combination wheel/drum pilots 14 and the individual drum pilots 12 each protrude outwardly from a same side of the drum piloting hub 10 and alternate between each flange hole (stud location). (See FIG. 3.) In other words, the combination wheel/drum pilots 14 are interdigitated amongst the individual drum pilots 12 around the hub barrel 16 (See also FIG. 1.)

Figure 2:
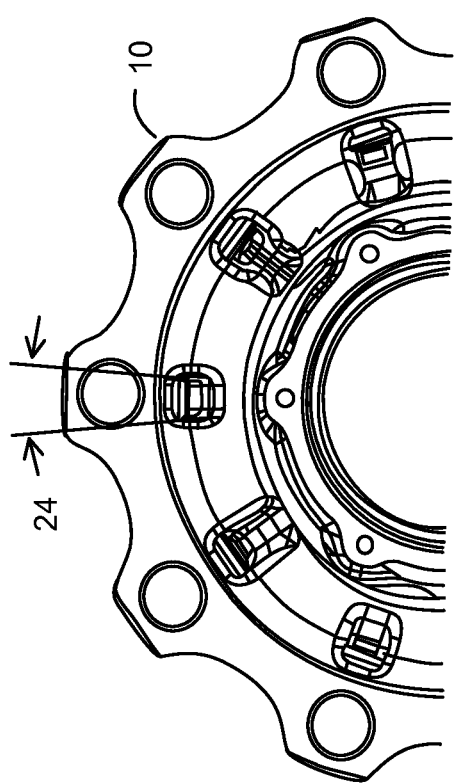
FIG. 2 is an enlarged partial view of the top portion of the drum piloting hub of FIG. 1.
Figure 6:
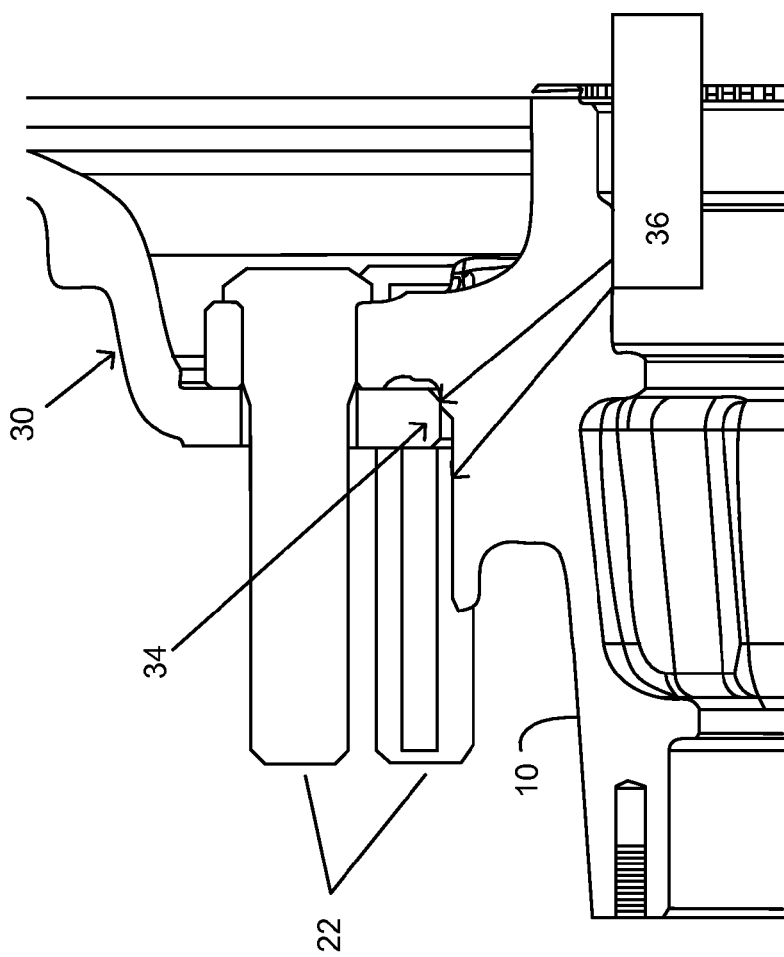
FIG. 6 is an enlarged partial view of the drum and hub interface of the drum piloting hub of FIG. 5.

Each individual drum pilot or combination wheel/drum pilot features a friction contact surface or contact surfaces for the drum and wheel pilots, as illustrated at 36 in FIG. 6, each of which defines an arc length. The size of each individual drum pilot or combination wheel/drum pilot, as measured by the arc length (illustrated at 24 of FIG. 2), is preferably controlled to minimize load induced stress interactions between the individual drum pilots 12 and the combination wheel/drum pilots 14, and also the interaction between the pilots and the barrel 16 of the hub. This is also desirable to control corrosion induced welding between the hub and drum in service. Ideally, arc length 24 is in the range of 0.25 to 1.00 inches for each of the drum pilot contact surfaces and the wheel pilot contact surfaces for a typical truck or other heavy vehicle applications.

Figure 5:
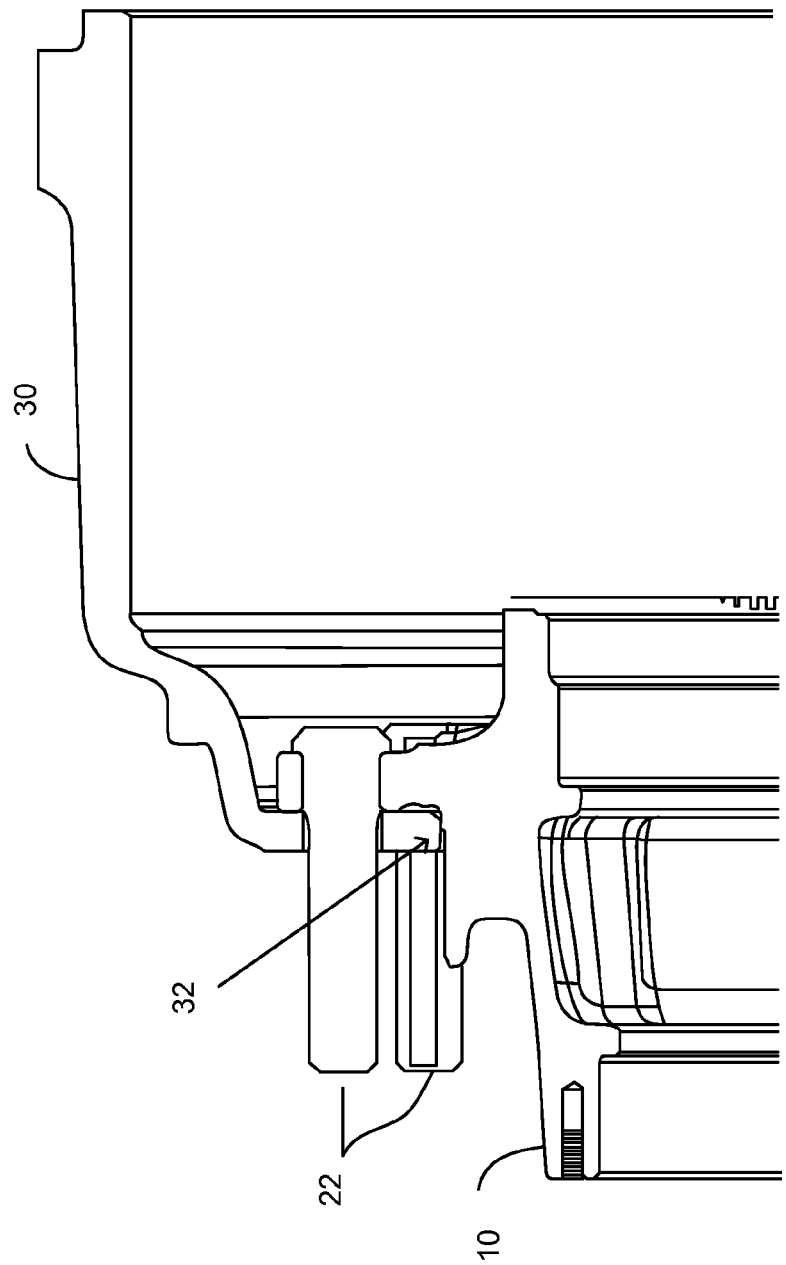
FIG. 5 is an enlarged partial view of the top portion of drum piloting hub of FIG. 3.

With reference to FIG. 5, when a brake drum 30 is mounted on the hub 10, a hub/drum interface is formed, as indicated at 32. Proper joint alignment is illustrated at 34 in the enlarged view provided by FIG. 6, as are the frictional surface contact areas 36.

While the preferred embodiments of the invention have been shown and described, it will be apparent to those skilled in the art that changes and modifications may be made therein without departing from the spirit of the invention, the scope of which is defined by the appended claims.

What is claimed is:

1. A wheel hub comprising:
  a. a hub barrel;
  b. a hub mounting portion positioned concentrically around the hub barrel, said hub mounting portion including a plurality of flange holes adapted to receive a plurality of wheel studs;
  c. a plurality of individual drum pilots and combination wheel/drum pilots positioned between the hub barrel and the hub mounting portion and concentric with the hub barrel, the combination wheel/drum pilots having a wheel mounting feature that is lacking in the individual drum pilots, and the combination wheel/drum pilots being interdigitated amongst the individual drum pilots around the hub barrel; and d. said plurality of individual drum pilots and combination wheel/drum pilots each protruding outwardly from a same side of the drum piloting hub and being radially aligned with said plurality of flange holes so that each of said plurality of flange holes has a corresponding individual drum pilot or wheel/drum pilot.

2. The wheel hub of claim 1 wherein a size of each of the plurality of individual drum pilots and combination wheel/drum pilots minimizes load induced stress interactions between the individual drum pilots and the combination wheel/drum pilots.

3. The wheel hub of claim 2 wherein a size of each of the plurality of individual drum pilots and combination wheel/drum pilots minimizes the interaction between the pilots and the barrel of the hub.

4. The wheel hub of claim 3 wherein each of the plurality of individual drum pilots has a drum pilot contact surface defining an arc length in the range of 0.25 to 1.00 inches.

5. The wheel hub of claim 4 wherein each of the plurality of combination wheel/drum pilots has a wheel pilot contact surface and a drum pilot contact surface, each defining an arc length in the range of 0.25 to 1.00 inches.

6. The wheel hub of claim 1 wherein each of the plurality of individual drum pilots has a drum pilot contact surface defining an arc length in the range of 0.25 to 1.00 inches.

7. The wheel hub of claim 6 wherein each of the plurality of combination wheel/drum pilots has a wheel pilot contact surface and a drum pilot contact surface, each defining, an arc length in the range of 0.25 to 1.00 inches.

8. A wheel hub comprising:
a. a hub barrel;
b. a hub mounting portion positioned concentrically around the hub barrel, said hub mounting portion including, a plurality of flange holes adapted to receive a plurality of wheel studs;
c. a plurality of drum pilots positioned one each between the hub barrel and the hub mounting portion and concentric with the hub barrel; and
d. said plurality of drum pilots each protruding outwardly from a same side of the drum piloting hub and being radially aligned with said plurality of flange holes so that each of said plurality of flange holes has a corresponding drum pilot, wherein said plurality of flange holes constitutes all of the flange holes in the hub mounting portion that are adapted to receive wheel studs.

9. The wheel hub of claim 8 wherein the plurality of drum pilots includes individual drum pilots and combination wheel/drain pilots.

10. The wheel hub of claim 9 wherein the individual drum pilots and the combination wheel/drum pilots are positioned around the hub barrel in an alternating fashion.

11. The wheel hub of claim 10 wherein a size of each of the plurality of individual drum pilots and combination wheel/drum pilots minimizes load induced stress interactions between the individual drum pilots and the combination wheel/drum pilots.

12. The wheel hub of claim 11 wherein a size of each of the plurality of individual drum pilots and combination wheel/drum pilots minimizes the interaction between the pilots and the barrel of the hub.

13. The wheel hub of claim 12 wherein each of the plurality of individual drum pilots has a drum pilot contact surface defining an arc length in the range of 0.25 to 1.00 inches.

14. The wheel hub of claim 13 wherein each of the plurality of combination wheel/drum pilots has a wheel pilot contact surface and a drum pilot contact surface, each defining an arc length in the range of 0.25 to 1.00 inches.

15. The wheel hub of claim 8 wherein a size of each of the plurality of drum pilots minimizes load induced stress interactions between the plurality of drum pilots.

16. The wheel hub of claim 15 wherein each of the plurality of drum pilots has a drum pilot contact surface defining an arc length in the range of 0.25 to 1.00 inches.

17. The wheel hub of claim 15 wherein a size of each of the plurality of drum pilots minimizes the interaction between the pilots and the barrel of the hub.

18. The wheel hub of claim 16 wherein each of the plurality of drum pilots has a drum pilot contact surface defining an arc length in the range of 0.25 to 1.00 inches.

19. The wheel hub of claim 8 wherein each of the plurality of drum pilots has a drum pilot contact surface defining an arc length in the range of 0.25 to 1.00 inches.

* * * * *

UNITED STATES PATENT AND TRADEMARK OFFICE
CERTIFICATE OF CORRECTION

PATENT NO. : 9,333,800 B2
APPLICATION NO. : 14/153375
DATED : May 10, 2016
INVENTOR(S) : Adam Wiechmann and Charlie Long It is certified that error appears in the above-identified patent and that said Letters Patent is hereby corrected as shown below:

In the Claims:

In claim 7, at column 3, line 33, delete the "," between "defining" and "an".

In claim 8, at column 3, line 39, delete the "," between "including" and "a".

Signed and Sealed this
Twenty-third Day of August, 2016

Michelle K. Lee
*Director of the United States Patent and Trademark Office*